Nov. 26, 1963  F. S. SCHADE  3,111,775
MASKING FLAP STRUCTURE FOR REMOVABLE ATTACHMENT
TO NOTEBOOK COVERS
Filed July 19, 1961

INVENTOR.
FRANK STANLEY SCHADE
BY Chapin & Neal
Attorneys 3,111,775
Patented Nov. 26, 1963

3,111,775
MASKING FLAP STRUCTURE FOR REMOVABLE ATTACHMENT TO NOTEBOOK COVERS
Frank Stanley Schade, Holyoke, Mass., assignor to National Blank Book Company, Holyoke, Mass., a corporation of Massachusetts
Filed July 19, 1961, Ser. No. 125,228
6 Claims. (Cl. 35—9)

This invention relates to masking apparatus for "program teaching" or "program learning" use and in particular to removable masking structure for attachment to the cover of a bound pack of sheets containing programmed sets of questions and answers.

Recent educational developments have proven the advantages of so-called "program teaching," which consists of a prepared series of separate questions and answers, each of which the student successively brings into view—answering the question, checking his answer against a correct printed answer and then going on to the next question in the series. A set of wel programmed questions enables a student to readily absorb a great amount of knowledge on a given subject in a relatively short time.

To assist "program teaching" methods various more or less elaborate machines and other types of aids have been devised for use with sets of questions and answers. An object of this invention is to provide an extremely simple, inexpensive structure which can be removably attached to the cover of a conventional type of bound pad of printed sheets or on the edge of an ordinary type of cover common to many types of conventional booklet or notebook structures and on the pages of which a program teaching course might be printed.

More specifically the object of this invention is to provide a masking attachment which may be utilized with a conventional spiral wire bound pack of sheets and which is of an inexpensive nature to promote a more wide spread use of program teaching methods. An additional object is to provide an attachment which requires no modification of the basically simple structure of a notebook of this type and which may be used over and over again on different bound notebook covers.

Still another object is to provide a composite flap construction whereby question and answer columns can both be shielded for successive unmasking while printed in side by side relation.

These and other objects and advantages of the invention will be apparent from the following description of an embodiment of the invention as shown in the drawings in which.

Figure 1:
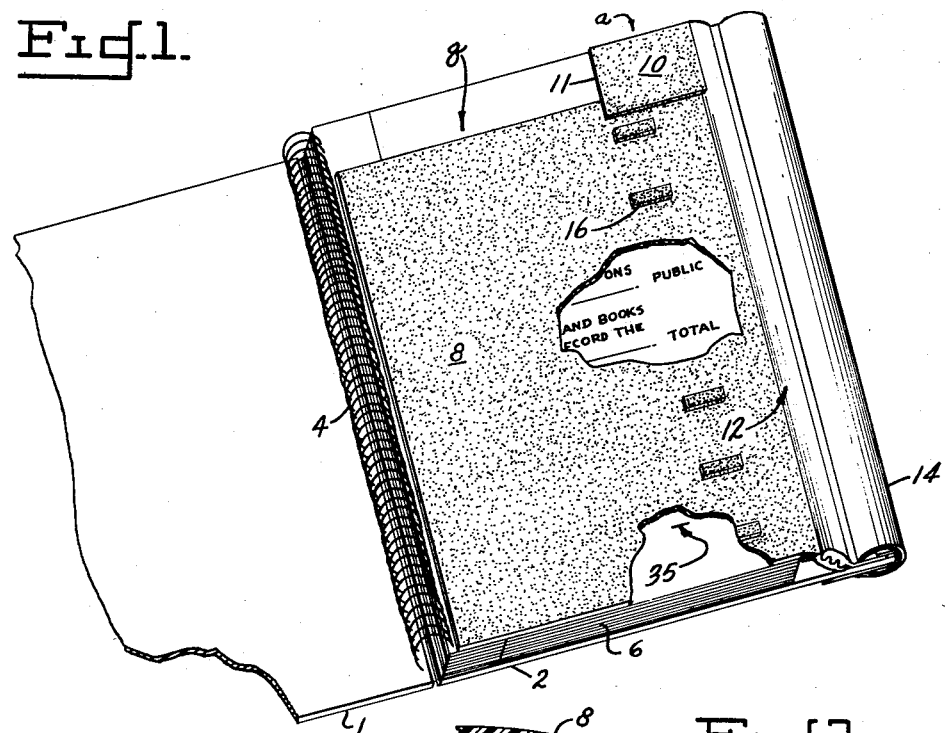
FIG. 1 is a pictorial view of the flap structure embodying the invention and attached to a conventional type of spiral wound notebook page.

Referring to the drawings, a conventional type of notebook with relatively stiff cover panels is shown as a spiral wire bound pad or pack of sheets (FIG. 1) having stiff cardboard cover panel members 1 and 2, helical wire 4, and stack of sheets 6 threaded on wire 4 between the covers. Overlying page 6 is a masking flap 8 transversely covering substantially the full width of a page and of less than the full length so that an exposed section is left at the top. Overlapping the right hand marginal position at the top edge of flap 8 and extending above it is a secondary flap 10.

On page 6 of the booklet will be printed the series of "programmed" questions and answers arranged in side by side columnar fashion. The questions are intended to be listed in sequence in the columnar area generally designated by the letter $q$. The answers will appear at the end of each question, being listed in the marginal columnar area of the page designated generally by the letter $a$.

Except for the top section flap 8 covers the column $q$. The entire column $a$ will underlie flap 8 and flap 10. Both flaps are held in predetermined position relative to the pages of the booklet by an interconnecting hinging means 12. The hinge section 12 permits sliding action of flaps 8 and 10 together relative to the pages or sheets 6 and is removably held on the edge of cover panel 2 by a gripping clamp member 14. Inwardly of its attached edge flap 8 is provided with a series of vertically spaced ribs or raised abutment portions as at 16. The ribs provide abutment means for the user's fingers to assist the sliding action of the flaps when proceeding from one question to the next.

Figure 3:
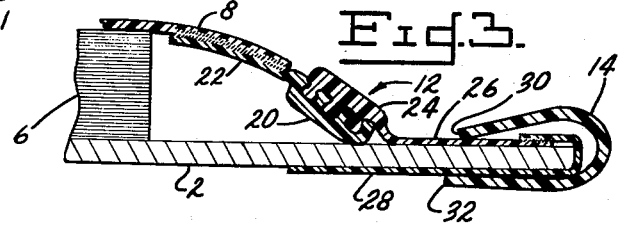
FIG. 3 is a section on line 3—3 of FIG. 1 showing constructional details.
Figure 4:
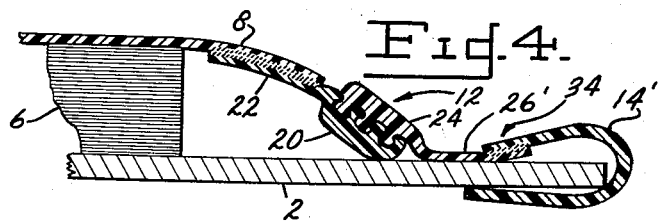
FIG. 4 is a view similar to FIG. 3 showing an alternative form of the attaching means.

The hinging interconnecting means 12 is best shown by FIG. 3, a modified construction being shown by FIG. 4. In each instance there is attached to the edge of the flap 8 a strip member having an interfitting portion 20 formed with longitudinal tongue and groove, slidable, dovetail connectors in the upper section and a flat, flap attaching section 22. The strip 20—22 is an extruded heat-sealable thermoplastic member, the section 22 being welded to the underedge margin of flap 8 which is preferably of decorative thermoplastic sheet material. A strip member having a tongue and groove portion 24, the tongues and grooves of which engage in the tongues and grooves of connecting portion 20 to form a sliding connection therewith, is formed with a flap section 26 to which (in FIG. 3) a thin sheet 28 of heat sealable material is welded. The sheet 28 is folded or nested to receive the edge of panel 2 snugly tucked into the recess provided thereby so as to position the portion 24 inwardly of the edge and parallel to it. Embracing the sheet 28 and section 26 is the elongated gripping or clamping member 14. Member 14 is of a stiffly resilient character, preferably made of high impact styrene material. The lips at 30 and 32 are normally urged together so that when fitted on opposite sides of panel 2, the panel edge is gripped thereby to frictionally bind the composite folded portion securely in place, thus holding the positional relationship of the hinging connector means with respect to the cover and pages of the book.

The thermoplastic sheet material of the masking flaps 8 and 10 is of limp and flexible character and thus flatly contacts in face to face covering relation whichever page is supported on cover 2 in immediately underlying relation to the flap. The material of the slidable interconnecting portions 20 and 24 and their respective flap portions 22 and 26 is of a slightly stiffer character but as mentioned above, is of thermoplastic for heat sealing the parts 8—22 and 26—28 together. The tongue and groove formations of portions 20 and 24 interfit with a slight frictional running fit so that the masking flaps will remain in position unless urged by finger pressure to move on the track formed by strip 24. The elongated clamp 14 preferably of high impact styrene material not only securely grips the folded positioning strip 28 but also gives a pleasing decorative molding strip appearance to the assembled unit.

It will be readily seen that the masking assembly as described can be used to succesively uncover each question and as the student user answers a question either by writing directly on page 6 in a blank provided for it or on a separate work sheet, the correct answer lying under flap 10 may be uncovered by turning flap 10 upwardly from its edge at 11. This may be done without manipulation of flap 8 in any way since flap 10 is independently movable and in the nature of a "tab" construction hinged to the extension of the connecting strip portions.

When the flap 8 has been moved downwardly of page 6, the lower portion extending beyond the bottom edge of cover 2 may be draped over a desk or table without interference to the user. When the top edge of the flap uncovers a warning marker as the line at 35 the user will then know that some slight degree of care must be taken in further sliding movement of the flap to avoid endwise separation of the grooved portions 20 and 24. That portion joining flap 10 to the hinging area permits viewing the lowermost section of the page above flap 8 without breaking the connection and thus easily permits the return of the flap 8 to its full masking position. This may be conveniently done by removing the corner of page 6 underlying flap 10 and any portion of the bottom of that page from underneath the flap 8. Then before turning the top page on wire 4, the flaps can be moved upwardly to cover the questions and answers on the next underlying page 6.

It will be realized that the flap structure can be entirely removed from the booklet merely by sliding the clamping member 14 from the edge and then lifting the folded portion away from it. The unit may then be fitted on any similar size booklet containing another set of "programmed" questions and answers prepared in similar format. If desired the reverse sides of page 6 may be printed with further programmed material in upside down relation to the material on the other side of the page, i.e. in 'tumble" printing manner. In this case the flap unit may itself be turned upside down and anchored on the edge of cover 1 for use with the "tumbled" sides of the pages.

In FIG. 4 the clamping member 14' is made integral with the connector portion 24 by heat-sealing the attaching portion 26' to it as indicated by the weld at 34. In this form the material of member 14' may be of stiffened vinyl material to grip the edge of the panel 2.

Figure 2:
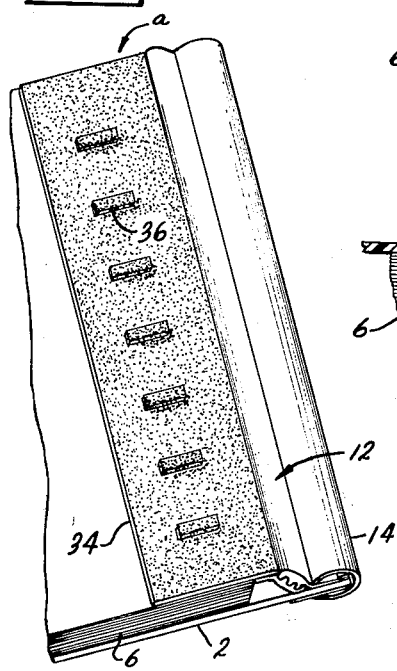
FIG. 2 is a fragmentary pictorial view similar to FIG. 1 showing an alternative form of the flap member.

In FIG. 2 a simplified flap 34 for the answer column *a* only is shown with protruding ribs 36 for assistance in sliding action. In this form the questions will be exposed and in view to the user. Otherwise the unit is similar and may be used for a series of "programmed" sets of the character described.

What is claimed is:

1. A detachable masking flap structure for mounting on the edge of a cover panel of a bound pack of program teaching sheets which comprises a masking flap of limp flexible material having along one edge an edge-connecting portion, flap mounting means including means receiving and interfitting with said edge-connecting portion of the flap for slidable movement of the latter and having releasable securing means engageable with a free unbound edge portion of a cover member of the bound pack, said edge-connecting portion of the flap being slidable longitudinally of the cover parallel to the secured edge thereof.

2. A detachable masking flap structure for mounting on the edge of a cover panel of a bound pack of program teaching sheets which comprises a flexible hinge member, means to releasably secure one edge portion of said hinge member to a free edge portion of a cover member of the bound pack and a masking flap, formed of limp, flexible material, connected to the free edge portion of said hinge member for sliding movement longitudinally thereof to extend over the adjacent free edge of the pack of sheets to mask, in part at least, the program material carried by the underlying sheet of the bound pack.

3. A masking flap structure as in claim 2 in which said masking flap is of a transverse dimension to substantially cover the full width of an underlying sheet of the bound pack, and said hinge member and said securing means extends upwardly above the top edge of the masking flap, and a secondary flap is hingedly affixed to said upwardly extending portions of said hinge member to cover the portion of a columnar area of the underlying sheet otherwise exposed above the masking flap.

4. A masking flap structure as in claim 2 in which the adjacent edge portions of said flap and hinge member are positioned in lapping relation and are dovetailed together at their interface to provide the said sliding movement of the masking flap longitudinally of the hinge member.

5. A masking flap structure as in claim 4 in which the edge portion of the hinge member which is to be secured to the cover member is folded around a free edge of the cover member, and is releasably secured thereto by a resilient clamping member which makes a forced embracing engagement about the free edge portion of the cover panel about which said edge portion of the hinge member is folded.

6. A masking flap structure as in claim 4 in which the edge portion of the hinge member to be secured is integrally connected to a resilient, clamping member which makes a forced embracing engagement about a free edge portion of the cover panel.

References Cited in the file of this patent
UNITED STATES PATENTS

| | | |
|---|---|---|
| 2,228,331 | Warner | Jan. 14, 1941 |
| 2,234,075 | Carolin | Mar. 4, 1941 |
| 2,628,435 | Minninger et al. | Feb. 17, 1953 |